United States Patent
Roux et al.

(10) Patent No.: US 11,250,841 B2
(45) Date of Patent: Feb. 15, 2022

(54) NATURAL LANGUAGE GENERATION, A HYBRID SEQUENCE-TO-SEQUENCE APPROACH

(71) Applicant: Conduent Business Services, LLC, Dallas, TX (US)

(72) Inventors: Claude Roux, Grenoble (FR); Julien Perez, Grenoble (FR)

(73) Assignee: CONDUENT BUSINESS SERVICES, LLC, Florham Park, NJ (US)

( * ) Notice: Subject to any disclaimer, the term of this patent is extended or adjusted under 35 U.S.C. 154(b) by 743 days.

(21) Appl. No.: 15/178,929

(22) Filed: Jun. 10, 2016

(65) Prior Publication Data

US 2017/0358295 A1  Dec. 14, 2017

(51) Int. Cl.
| | |
|---|---|
| *G10L 15/18* | (2013.01) |
| *G10L 15/16* | (2006.01) |
| *G06N 5/04* | (2006.01) |
| *G06F 40/30* | (2020.01) |
| *G06F 40/40* | (2020.01) |
| *G06F 40/56* | (2020.01) |
| *G06F 40/268* | (2020.01) |
| *G06F 40/284* | (2020.01) |
| *G06F 16/332* | (2019.01) |

(52) U.S. Cl.
CPC .......... *G10L 15/18* (2013.01); *G06F 16/3329* (2019.01); *G06F 40/268* (2020.01); *G06F 40/284* (2020.01); *G06F 40/30* (2020.01); *G06F 40/40* (2020.01); *G06F 40/56* (2020.01); *G06N 5/04* (2013.01); *G10L 15/16* (2013.01)

(58) Field of Classification Search
None
See application file for complete search history.

(56) References Cited

U.S. PATENT DOCUMENTS

| | | |
|---|---|---|
| 9,473,637 B1 * | 10/2016 | Venkatapathy ..... H04M 3/5175 |
| 2003/0074187 A1 | 4/2003 | Alt-Mokhtar et al. |
| 2005/0138556 A1 | 6/2005 | Brun et al. |
| 2007/0192085 A1 | 8/2007 | Roulland et al. |
| 2008/0294423 A1 | 11/2008 | Castellani et al. |
| 2009/0106224 A1 | 4/2009 | Roulland et al. |
| 2009/0292700 A1 | 11/2009 | Castellani et al. |

(Continued)

OTHER PUBLICATIONS

Xuchen Xao, Gosse Bouma, Xi Chang, Semantics-based Question Generation and Implementation, 2012, pp. 11-40 URL: http://cs.jhu.edu/~xuchen/paper/Yao2012DDqg.pdf.*

(Continued)

*Primary Examiner* — Richa Mishra
(74) *Attorney, Agent, or Firm* — Fay Sharpe, LLP

(57) ABSTRACT

A method and method for natural language generation employ a natural language generation model which has been trained to assign an utterance label to a new text sequence, based on features extracted from the text sequence, such as parts-of-speech. The model assigns an utterance label to the new text sequence, based on the extracted features. The utterance label is used to guide the generation of a natural language utterance, such as a question, from the new text sequence. The system and method find application in dialog systems for generating utterances, to be sent to a user, from brief descriptions of problems or solutions in a knowledge base.

22 Claims, 4 Drawing Sheets

(56) References Cited

U.S. PATENT DOCUMENTS

| | | | |
|---|---|---|---|
| 2011/0123967 A1 | 5/2011 | Perronnin et al. | |
| 2016/0132501 A1* | 5/2016 | Mengle | G06F 16/288 707/771 |
| 2017/0177795 A1* | 6/2017 | Mabotuwana | G06F 19/321 |
| 2017/0286396 A1* | 10/2017 | Sandor | G06F 17/279 |

OTHER PUBLICATIONS

Yuzhu Wang, Hai Zhao, Dan Shi, A Light Rule-based Approach to English Subject-Verb Agreement Errors on the Third Person Singular Forms, 2015, PACLIC, pp. 345-351 URL: http://www.aclweb.org/anthology/Y15-2040.*

Yuzhu Wang, Hai Zhao, Dan Shi, A Light Rule-based Approach to English Subject-Verb Agreement Errors on the Third Person Singular Forms, 2015, PACLIC, pp. 345-351 URL: http://www.aclweb.org/anthology/Y15-2040 (Year: 2015).*

Nina Dethlefs, Helen Hastie, Heriberto Cuayahuitl and Oliver Lemon; Conditional Random Fields for Responsive Surface Realisation using Global Features; Aug. 2013; p. all (as attached) URL: http://www.aclweb.org/anthology/P13-1123 (Year: 2013 ).*

Abhinav Rastogi; Context Encoding LSTM, Dec. 2015, p. all URL: https://nlp.stanford.edu/courses/cs224n/2015/reports/16.pdf (Year: 2013).*

U.S. Appl. No. 15/147,222 filed filed May 5, 2016, Xaio, et al..

U.S. Appl. No. 14/617,305 filed filed Feb. 9, 2015, Roux, et al..

U.S. Appl. No. 14/702,850 filed filed May 4, 2015, Dymetman, et al..

U.S. Appl. No. 14/811,005 filed filed Jul. 28, 2015, Dymetman, et al..

U.S. Appl. No. 15/005,133 filed filed Jan. 25, 2016, Perez, et al..

Ait-Mokhtar, et al., "Robustness beyond shallowness: incremental deep parsing," Natural Language Engineering, 8(2-3), pp. 121-144 (2002).

Bishop, "Generative or Discriminative? Getting the Best of Both Worlds," Bayesian Statistics 8, pp. 3-24 (2007).

Gardent, et al., "Generating with a grammar based on tree descriptions: a constraint-based approach," ACL, pp. 212-219 (2001).

Hastie, et al., "A comparative evaluation methodology for NLG in interactive systems," LREC, pp. 4004-4011 (2014).

Hochreiter, et al., "Long short-term memory," Neural Computation, 9(8), pp. 1735-1780 (1997).

Lemon, "Learning what to say and how to say it: Joint optimization of spoken dialogue management and natural language generation," Computer Speech and Language, 25(2), pp. 210-221 (2011).

Langkilde, et al., "Generation that exploits corpus-based statistical knowledge," Proc. 36th Annual Meeting of the Association for Computational Linguistics and 17th Int'l Conf. on Computational Linguistics—vol. 1, ACL '98, pp. 704-710 (1998).

Mairesse, et al., "Stochastic language generation in dialogue using factored language models," Computational Linguistics, 40(4), pp. 763-799 (2014).

Oh, et al., "Stochastic natural language generation for spoken dialog systems," Computer Speech & Language, 16(3-4), pp. 387-407 (2002).

Pereira, et al., "Definite clause grammars for language analysis," Artificial Intelligence, 13, pp. 231-278 (1980).

Ritter, et al., "Data-driven response generation in social media," EMNLP, pp. 583-593 (2011).

Stent, et al., "Evaluating automatic extraction of rules for sentence plan construction," SIGDIAL Conf., pp. 290-297 (2009).

Sutton, et al., "An introduction to conditional random fields," Foundations and Trends in Machine Learning, 4(4), pp. 267-373 (2012).

Stent, et al., "Trainable sentence planning for complex information presentations in spoken dialog systems," ACL, pp. 79-86 (2004).

Wen, et al., "Semantically conditioned LSTM-based natural language generation for spoken dialogue systems," EMNLP, pp. 1711-1721 (2015).

Walker, et al., "Training a sentence planner for spoken dialogue using boosting," Computer Speech & Language, 16(3-4), pp. 409-433 (2002).

Williams, et al., "Partially observable Markov decision processes for spoken dialog systems," Computer Speech & Language, 21(2), pp. 393-422 (2007).

* cited by examiner

NATURAL LANGUAGE GENERATION, A HYBRID SEQUENCE-TO-SEQUENCE APPROACH

BACKGROUND

The exemplary embodiment relates to natural language generation and finds particular application in an automated dialog system for conducting a dialog with a person.

In autonomous dialog systems, a software component, often referred to as a virtual agent, conducts a discourse with a person in a natural language. Dialogue systems usually include three parts: a Natural Language Understanding (NLU) module, a Dialogue Manager (DM) module, and a Natural Language Generation (NLG) module. The NLG module is used to generate a surface realization (i.e., grammatical text, understandable by people) of a dialog act, such as a question, confirmation, or affirmation, expressed in a representational form.

The Dialog system often has access to a database containing previously-generated text snippets (i.e., short sequences of words, which do not necessarily form complete sentences) which can be assembled to formulate a specific dialog act. In the context of diagnosis, the text snippets represent different kinds of information, such as known solutions or problem symptoms. For example, if a customer requests assistance in using features of their phone, such as turning on the WiFi, the dialog system will utilize text snippets particular to the phone device. For generating the surface realization, the text snippets often need to be transformed into questions, and the task of the NLG module is to determine how to phrase the question.

The NLG module is often organized into a sequence of components. First, a content planner links the intention of the communication (an instruction given by a Dialog Manager) to a semantic representation. Then, a sentence planner links the semantic representation to a syntactic representation. Finally, a surface realizer converts the sentence plan into natural language (Helen F. Hastie, et al., "A comparative evaluation methodology for NLG in interactive systems," LREC, pp. 4004-4011 (2014)).

However, identifying the kind of questions that can be built out of a specific text snippet can be challenging, due to the paucity of internal structures.

Machine learning (ML) techniques for text generation have been slow to develop, due in part to the lack of semantically annotated data. They have been proposed for selecting the best utterance among those that have been over-generated with a generation grammar (Irene Langkilde, et al., "Generation that exploits corpus-based statistical knowledge," Proc. 36th Annual Meeting of the ACL and 17th Int'l Conf. on Computational Linguistics, Vol. 1, pp. 704-710 (1998)). They have also been used for guiding the decision process itself, through the extraction of a set of generation parameters to maximize an objective function (Oliver Lemon, "Learning what to say and how to say it: Joint optimisation of spoken dialogue management and natural language generation," Computer Speech and Language, 25(2):210-221 (2011), François Mairesse, et al., "Stochastic language generation in dialogue using factored language models," Computational Linguistics, 40(4):763-799 (2014), "Mairesse 2014"). In some ML approaches, the meaning of what should be generated is mapped over a set of semantic variables, which these systems learn to associate with complex syntactic templates. Most of these approaches over-generate candidates, which are then pruned to select the most probable one. For example, a Language Model is used to prune over-generated sentences (Alice Oh, et al., "Stochastic natural language generation for spoken dialog systems," Computer Speech & Language, 16(3-4):387-407 (2002). Additionally, most of these approaches rely on a substantial amount of manual input and require fairly complex semantic annotations to proceed with the planning and generation part (Marilyn A. Walker, et al., "Training a sentence planner for spoken dialogue using boosting," Computer Speech & Language, 16(3-4):409-433 (2002); Amanda Stent, et al., "Trainable sentence planning for complex information presentations in spoken dialog systems," ACL, pp. 79-86 (2004)).

In one method, sentence planning rules are learnt from a corpus of utterances labelled with Rhetorical Structure Theory (RST) discourse relations (Amanda Stent, et al., "Evaluating automatic extraction of rules for sentence plan construction," SIGDIAL Conf., pp. 290-297 (2009)). In this case, the annotation task is relatively complex and entails use of experts to annotate the different utterances with discourse relations. In Mairesse 2014, the method includes annotating a constituent tree generated from a dialog corpus with aligned semantic stacks that are then associated to a dialog act. Each dialog act corresponds to a given action of communication with a customer, such as requesting some additional information (ask-name, ask-age) or some precisions (ask-phone-model etc.). Each semantic stack is descriptive element such as: Peter/name/inform, where Peter is an entity, name is the nature of that entity and inform is a dialog act type.

One of the main drawbacks with such approaches is that they require annotations to be supplied by human annotators to train the system. The nature of the annotations is such that annotators need to be experienced in linguistics.

Deep recurrent neural models have also been investigated for Natural Language Generation (Tsung-Hsien Wen, et al., "Semantically conditioned LSTM-based natural language generation for spoken dialogue systems," EMNLP, pp. 1711-1721 (2015)). In this approach, a predefined structured representation of dialog acts is converted to a surface realization in an end-to-end manner. This approach requires a predefined structured representation of the dialog intention (i.e., dialog act).

There remains a need for a system and method for natural language generation which avoids the need for extensive manual annotations or an explicit structured representation of the dialog act.

INCORPORATION BY REFERENCE

The following references, the disclosures of which are incorporated herein by reference, are mentioned.

Sequential models are described, for example, in U.S. application Ser. No. 15/147,222, filed May 5, 2016, entitled SEMANTIC PARSING USING DEEP NEURAL NETWORKS FOR PREDICTING CANONICAL FORMS, by Chunyang Xaio, et al.

Dialog systems are disclosed, for example, in U.S. application Ser. No. 14/617,305, filed Feb. 9, 2015, entitled SYSTEM AND METHOD FOR RESPONSE GENERATION USING LINGUISTIC INFORMATION, by Claude Roux, et al.; U.S. application. Ser. No. 14/702,850, filed May 4, 2015, entitled METHOD AND SYSTEM FOR ASSISTING CONTACT CENTER AGENTS IN COMPOSING ELECTRONIC MAIL REPLIES, by Marc Dymetman, et al.; U.S. application Ser. No. 14/811,005, filed Jul. 28, 2015, entitled A ROBUST REVERSIBLE FINITE-STATE APPROACH TO CONTEXTUAL GENERATION AND SEMANTIC PARSING, by Marc Dymetman, et al.; U.S. application Ser. No. 15/005,133, filed Jan. 25, 2016, entitled COMPLEXITY AWARE CALL-STEERING STRATEGY IN HETEROGENEOUS HUMAN/MACHINE CALL-CENTER ENVIRONMENTS, by Julien Perez, et al.; and U.S. Pub. No. 20110123967, published May 26, 2011, entitled DIALOG SYSTEM FOR COMPREHENSION EVALUATION, by Perronnin, et al.

Natural language processing is described, for example, in U.S. Pub. No. 20030074187, published Apr. 17, 2003, entitled NATURAL LANGUAGE PARSER, by Aït-Mokhtar, et al.; U.S. Pub. No. 20050138556, published Jun. 23, 2005, entitled CREATION OF NORMALIZED SUMMARIES USING COMMON DOMAIN MODELS FOR INPUT TEXT ANALYSIS AND OUTPUT TEXT GENERATION, by Brun et al.

Troubleshooting systems are described, for example, in U.S. Pub. No. 20070192085, published Aug. 16, 2007, entitled NATURAL LANGUAGE PROCESSING FOR DEVELOPING QUERIES, by Roulland, et al.; U.S. Pub. No. 20080294423, published Nov. 27, 2008, entitled INFORMING TROUBLESHOOTING SESSIONS WITH DEVICE DATA, by Castellani, et al.; U.S. Pub. No. 20090106224, published Apr. 23, 2009, entitled REAL-TIME QUERY SUGGESTION IN A TROUBLE SHOOTING CONTEXT, by Roulland, et al.; and U.S. Pub. No. 20090292700, published Nov. 26, 2009, entitled SYSTEM AND METHOD FOR SEMI-AUTOMATIC CREATION AND MAINTENANCE OF QUERY EXPANSION RULES, by Castellani, et al.

BRIEF DESCRIPTION

In accordance with one aspect of the exemplary embodiment, a method for natural language generation includes providing a natural language generation model, which has been trained to assign an utterance label to a text sequence based on features extracted from the text sequence. A new text sequence is received. Features are extracted from the text sequence. An utterance label is assigned to the new text sequence, based on the extracted features, with the trained natural language generation model. A natural language utterance is generated from the new text sequence, using the assigned utterance label to guide the generation of the natural language utterance.

At least one of the extracting and generating may be performed with a processor.

In accordance with another aspect of the exemplary embodiment, a system for natural language generation includes memory which stores a natural language generation model. The model has been trained to assign an utterance label to a text sequence based on features extracted from the text sequence. A features extractor extracts features from an input text sequence. A labeling component assigns an utterance label to the input text sequence, based on the extracted features, with the trained natural language generation model. A surface realization component generates a natural language utterance from the input text sequence, using the assigned utterance label to guide the generation of the natural language utterance. A processor implements the feature extractor, labeling component, and surface realization component.

In accordance with another aspect of the exemplary embodiment, a method for generating a natural language generation system includes receiving a collection of text sequences and for each text sequence, a natural language utterance in a communicative form. Utterance labels are extracted from the natural language utterances, each utterance label including a sequence of at least one word, the sequence including an auxiliary verb and optionally a pronoun ad/or other part of speech. Features are extracted from each of the text sequences. A natural language generation model is trained using the extracted features from each of the text sequences and the extracted utterance labels, to assign an utterance label to a new text sequence. Parts of a realization model are indexed according to respective utterance labels for guiding the generation of a natural language utterance from a new text sequence, using an assigned utterance label.

At least one of the extracting utterance labels, extracting features, training the natural language generation model and indexing parts of the realization model may be performed with a processor.

DETAILED DESCRIPTION

Aspects of the exemplary embodiment relate to a system and method for natural language generation and to a method for generating such a system. In particular aspects, the system and method are used for generating surface realizations of dialog acts from short text sequences (canned text snippets), using a combination of Natural Language Processing (NLP) tools and annotation-based machine learning.

In the exemplary system and method, a natural language utterance, e.g., in the form of a question, is formulated from a text sequence. A communicative function is learnt using a dedicated instance of a Natural Language Generation (NLG) model without the necessity of an explicit structured representation of the intent.

Figure 1:
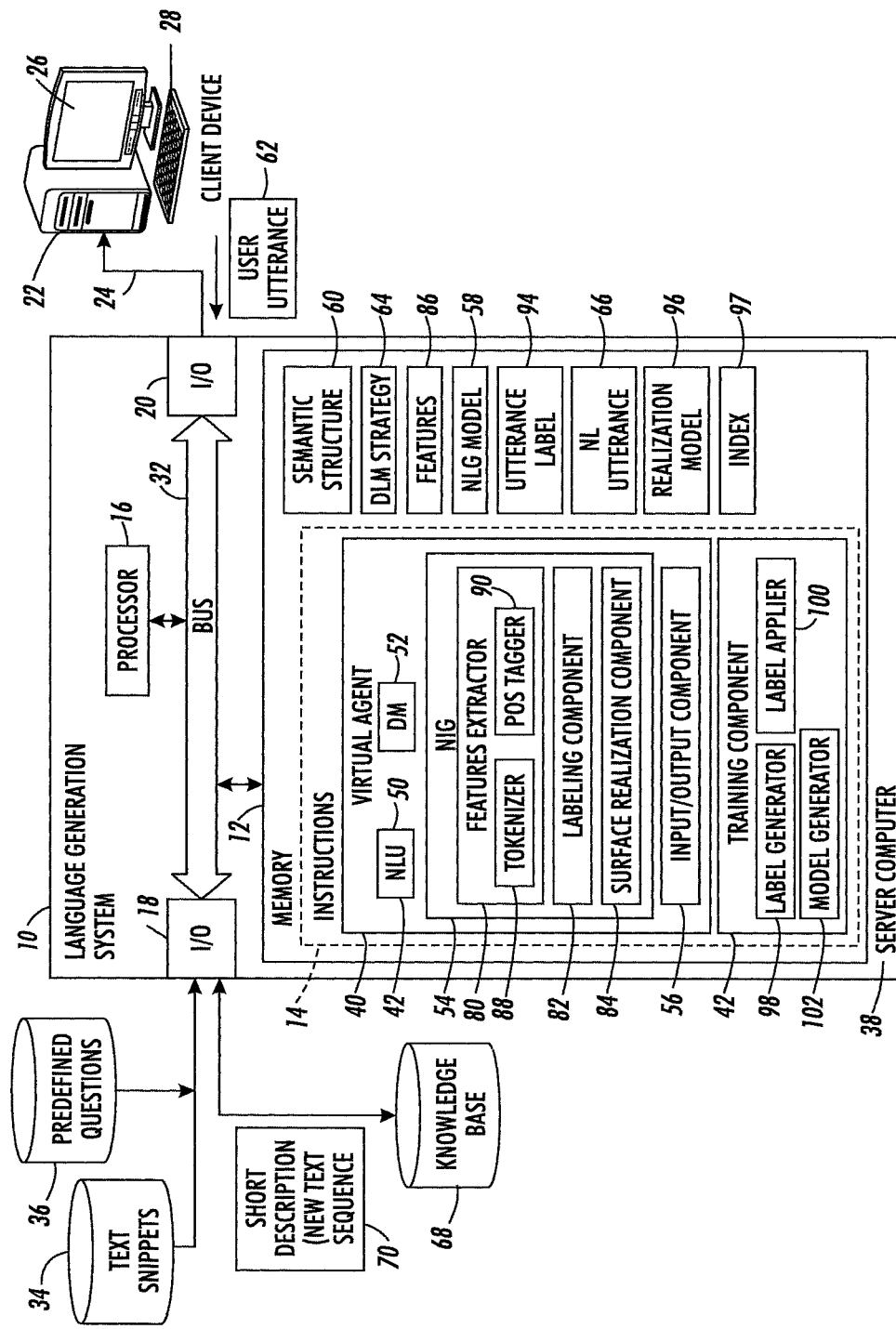
FIG. 1 is a functional block diagram of a dialog system with includes a natural language generation unit in accordance with one aspect of the exemplary embodiment.

With reference to FIG. 1, a functional block diagram of a computer-implemented system 10 for language generation is shown. The illustrated computer system 10 includes memory 12 which stores software instructions 14 for performing the method illustrated in FIGS. 2 and/or 3 and a processor 16 in communication with the memory for executing the instructions. The system 10 also includes one or more input/output (I/O) devices 18, 20. The I/O interface 20 may communicate with a client device 22, via a wired or wireless connection 24, such as the internet. The client device may include one or more of a display 26, for displaying information to users, and a user input device 28, such as a keyboard or touch or writable screen, and/or a cursor control device, such as mouse, trackball, microphone, or the like, for inputting text or spoken words, and a processor 30 for communicating user input information and command selections to the processor device 16. The various hardware components 12, 16, 18, 20 of the system 10 may all be connected by a data/control bus 32.

The system 10 may access to a collection 34 of text sequences and a corresponding collection 36 of predefined natural language utterances (e.g., questions), which may be stored in local memory 12 during processing. The text snippets 34 and natural language utterances 36 are used in training, as described in further detail below.

The computer system 10 may include one or more computing devices 38, such as a PC, such as a desktop, a laptop, palmtop computer, portable digital assistant (PDA), server computer, cellular telephone, tablet computer, pager, combination thereof, or other computing device capable of executing instructions for performing the exemplary method.

The memory 12 may represent any type of non-transitory computer readable medium such as random access memory (RAM), read only memory (ROM), magnetic disk or tape, optical disk, flash memory, or holographic memory. In one embodiment, the memory 12 comprises a combination of random access memory and read only memory. In some embodiments, the processor 16 and memory 12 may be combined in a single chip. Memory 12 stores instructions for performing the exemplary method as well as the processed data.

The network interface 18, 20 allows the computer to communicate with other devices via a computer network, such as a local area network (LAN) or wide area network (WAN), or the internet, and may comprise a modulator/demodulator (MODEM) a router, a cable, and/or Ethernet port.

The digital processor device 16 can be variously embodied, such as by a single-core processor, a dual-core processor (or more generally by a multiple-core processor), a digital processor and cooperating math coprocessor, a digital controller, or the like. The digital processor 16, in addition to executing instructions 14 may also control the operation of the computer 30.

The term "software," as used herein, is intended to encompass any collection or set of instructions executable by a computer or other digital system so as to configure the computer or other digital system to perform the task that is the intent of the software. The term "software" as used herein is intended to encompass such instructions stored in storage medium such as RAM, a hard disk, optical disk, or so forth, and is also intended to encompass so-called "firmware" that is software stored on a ROM or so forth. Such software may be organized in various ways, and may include software components organized as libraries, Internet-based programs stored on a remote server or so forth, source code, interpretive code, object code, directly executable code, and so forth. It is contemplated that the software may invoke system-level code or calls to other software residing on a server or other location to perform certain functions.

The illustrated software instructions 14 include an autonomous dialog system (virtual agent 40), which communicates with an end user (e.g., a customer or other person) operating the client device 22, and a training component 42. The virtual agent 40 may include a set of separate components, including a Natural Language Understanding module (NLU) 50, a Dialog Manager (DM) 52, a Natural Language Generation module (NLG) 54, and an input/output component 56 for communicating utterances between the system and the client device. The training component 42 trains a Natural Language Generation model 58, which is employed by the NLG 54.

The NLU 50 extracts a semantic structure 60 from customer utterances 62 received into memory by the input/output component 56. The NLU processes text 62 input to the system 10 by the customer device 22 by automatically extracting and understanding the information contained in the text, such as identifying the customer's needs and translating the customer's needs into a formal language which the system can process. During training, the NLU component 50 may perform analogous processing on previously collected customer-agent dialogs to generate a representation for each different customer problem and/or agent solution.

The NLU component 50 may include a parser, such as a syntactic parser, which implements specific rules, referred to as an action grammar, which may be written on top of conventional parser rules. The parser can extract lexical, syntactic, and semantic information or dependencies from a dialogue text that provide context in which words occur, which can each be represented by a dependency graph 60.

The DM 52 takes as input the semantic structure 60 defined by the NLU 50, and develops a step by step strategy 64 to gather information from the customer in order to find a solution to their problem or fulfill a predefined task or set of tasks.

Further details of NLU and DM modules 50, 52 which may be utilized herein are described, for example, in Jason D. Williams, et al., "Partially observable Markov decision processes for spoken dialog systems," Computer Speech & Language, 21(2):393-422 (2007) and above-mentioned U.S. application Ser. No. 14/617,305.

The NLG 54 produces natural language utterances 66 in a communicative form, such as a question, based on the DM instructions.

The dialog between a virtual agent 40 and a customer usually proceeds in different stages, each represented as a specific state. Since the initial utterance 62 provided by a customer is usually insufficient to formulate a definitive response to a given problem, the DM often poses specific questions or displays propositions to enrich its current comprehension of the dialog state. The DM 42 may detect missing information using a knowledge base 68, which contains short descriptions 70 about, for example symptoms and/or corresponding solutions. However, these descriptions 70 are usually quite short text sequences, with little or no linguistic structure. Each description 70 may consist of a sentence, or a text sequence that is shorter than an entire sentence, and which is not in a selected communicative form, e.g., is a simple statement of a problem or solution. The exemplary NLG module 54 converts such short descriptions 70 into NL utterances 66. The utterance generated serves as a surface realization of a dialog act, which is output to the client device 22. In one embodiment, the NL utterances 66 output by the system 10 are in an interrogatory form (phrased as a question), although other communicative forms of utterance are also contemplated, such as an affirmation or confirmation. The type of utterance required for a given state of the dialog may be specified by the DM 52 and a respective NLG model 58 may be provided for each utterance type.

TABLE 1 shows illustrative examples of short descriptions 70 (text snippets) and their corresponding surface realizations 66 in the form of interrogatory utterances.

TABLE 1

Examples of short descriptions and corresponding surface realizations

| TEXT SNIPPET | INTERROGATIVE SURFACE REALIZATION | UTTERANCE LABEL |
|---|---|---|
| Unable to connect to the internet. | Can you connect to the internet? | Can-you |

TABLE 1-continued

Examples of short descriptions and
corresponding surface realizations

| TEXT SNIPPET | INTERROGATIVE SURFACE REALIZATION | UTTERANCE LABEL |
|---|---|---|
| Incorrect migration done. | Have you done an incorrect migration? | Have-you |
| Unlatching process has failed. | Did the unlatching process fail? | Did |
| Date of beginning of contract | When did you sign your contract? | When-did |

As can be seen in these examples, these text snippets 70 lack any proper linguistic structures. Conventional tools used in NLU modules are usually designed for use on much richer and more complex sentences. See, for example, Salah Ait-Mokhtar, et al., "Robustness beyond shallowness: incremental deep parsing," Natural Language Engineering, 8(2-3):121-144, 2002. This makes it difficult for them to analyze the text snippets properly in order to identify which surface realization to choose.

The present NLG module 54 includes a features extractor 80, a labeling component 82, and a surface realization component 84.

The features extractor 80 extracts features 86 from a short description 70 selected by the dialog manager 52. In general, this short description is one which does not yet have an associated surface realization 66. Each token of the short description 70 is associated with one or more features, such as one, two, or more features. The exemplary features extracted include part-of-speech (POS) tags for the words (or, more generally, tokens) of the short description 70. The features extractor 80 may include or have access to a tokenizer 88, which splits the short description 70 into a sequence of tokens, and a POS tagger 90, which tags each token with its most probable POS tag from a predefined set of POS tags. In some embodiments, the tokenizer 88 and POS tagger 90 may be combined into a single component referred to as a tagger. In addition to a conventional set of POS tags, such as adjective, adverb, determiner, preposition, and punctuation (and/or other tokens not recognized as words), the exemplary set of POS tags includes specific tags for different classes of verb and noun, as illustrated in TABLE 2.

TABLE 2

Specific POS tags

| POS-TAG | Corresponding condition |
|---|---|
| Verb3 | the verb is in the 3rd person |
| Verbing | the verb ends with ing (gerund) |
| Verbd | the verb is a past-participle |
| Verb | the verb is an infinitive |
| Noun | the noun is a singular noun |
| Nouns | the noun is a plural noun |

Thus, for example, given the short description 70: Unlatching process has failed, the tokenizer 88 generates a sequence of tokens (which can also be used as features) (Unlatching, process, has, failed, punct.) and the POS tagger 70 generates a sequence of POS-tag features (Verbing, Noun, Verb3, Verbd, 0), where 0 indicates a null category of POS tags used for punctuation.

The labeling component 82 uses the NLG model 58 to predict an utterance label 94 for an utterance 66, based on the features extracted from the short description 70. In particular, the labeling component 82 inputs the extracted features 86 into a trained sequential decision model 58. The model 58 uses the features 86 of each token, and those of previous (and optionally, subsequent) token(s), to sequentially predict the utterance label 94. The output 94 of the model 58 is a sequence of one or more words, such as one, two, or three words. In the case of question generation, the utterance label generally includes an auxiliary verb or a pronoun and an auxiliary verb and may terminate in the auxiliary verb or pronoun. Auxiliary verbs are used together with a main verb to show the verb's tense or to form a negative or question. Table 1 above lists example utterance labels 94 for the short descriptions, which generally correspond to a first few words of the corresponding utterance.

In one embodiment, the NLG model 58 is a Conditional Random Field (CRF) model, as described, for example, in Charles A. Sutton, et al., "An introduction to conditional random fields," Foundations and Trends in Machine Learning, 4(4):267-373 (2012). Other sequential decision models which can be used include recurrent neural network models, such as Long Short-Term Memory (LSTM) encoders, as described, for example, in Sepp Hochreiter, et al., "Long short-term memory," Neural Computation, 9(8):1735-1780 (1997). A recurrent neural network model 58 may be implemented in a neural network programming library, such as Keras (Francois Chollet, "Keras," GitHub repository, 2015, available at https://github.com/fchollet/keras; and "Keras: Deep Learning library for Theano and TensorFlow," available at http://keras.io/) on top of a compiler such as Theano (see, Bergstra, et al., "Theano: a CPU and GPU math expression compiler," Proc. Python for Scientific Computing Conf. (SciPy), vol. 4, p. 3, 2010; Bastien, et al., "Theano: new features and speed improvements" NIPS 2012 deep learning workshop; and Theano 0.7 documentation, available at http://deeplearning.net/software/theano/).

Such pattern recognition models are well suited to this type of sequential prediction. Whereas an ordinary classifier predicts a label for a single sample (here, a token's feature set) without regard to neighboring samples, a sequential model takes context into account; e.g., the linear chain CRF model predicts sequences of labels for sequences of input samples. Recurrent neural models, such as LSTM encoders leverage internal states to infer subsequent labels.

The surface realization component 84 uses the utterance label 94 to generate an NL utterance 66, e.g., in interrogatory form, from the short description 70. In particular, the utterance label 94 and short description 70 are input to a realization model 96 which outputs an NL utterance 66 based thereon. The realization model 96 may be a generative model, which employs a generation grammar to generate NL utterances 66, or a recognition model, which employs a set of set of automata, which accept NL utterances.

For example, a generation grammar, such as Tree Adjoining Grammars (Claire Gardent, et al., "Generating with a grammar based on tree descriptions: a constraint-based approach," ACL, pp. 212-219 (2001)) or Definite Clause Grammar (DCG) (F. C. N. Pereira, et al., "Definite clause grammars for language analysis," Artificial Intelligence, 13:231-278, 1980, "Pereira 1980") can be used as the for generation. The generation process can also be implemented as word automata (confusion networks) (Alan Ritter, et al., "Data-driven response generation in social media," EMNLP, pp. 583-593 (2011)). In one specific embodiment, the generation grammar includes a Definite Clause Grammar implemented with a linguistic engine to generate the sentences as described in Pereira 1980.

The generation grammar or set of automata 96 both have several entry points, which lead to different surface realizations. In the exemplary embodiment, the labels yielded by the NLG model 58 are used to define which part of the grammar or which automaton should be used to proceed with the surface realization. In particular, sub-parts of the grammar or different automata are indexed on each of the possible utterance labels 94 that the NLG model 58 has learnt. Index 97 stores the set of utterance labels generated in training and for each label, a list of the grammar parts or automata which can be used with that label. For example, if the NLG component 54 is requested to generate a question out of the short description Device connect to the internet, the NLG model 58 first produces a label, such as "Does." The surface realization component identifies, from the index, the part(s) of the generation grammar which can generate utterances starting with the word Does, and uses that part to produce a question 66 such as Does the device connect to the internet?

The output component 56 outputs the generated utterance 66, e.g., to the user device 22.

Training the NLG Model

The system may include a training component 42, as illustrated in FIG. 1, for training the NLG model 58, or the model may be generated elsewhere and input to the system 10.

The NLG model 58 is trained with features extracted from the training collection 34 of text snippets (which may be short descriptions extracted from the knowledge base 68) and corresponding utterance labels analogous to labels 94, which are generated from the predefined utterances (e.g., questions) 36 corresponding to the text snippets 82.

The utterance labels of the training utterances 36 serve as the classes which the NLG model 58 needs to learn. In the training phase, each token of each text snippet 34 is associated with the respective class.

To generate the training set 34, 36, annotators may be provided with the text snippets 34 and asked to generate a question from each. In some cases, a text snippet may be associated with more than one question 36, e.g., provided by different annotators. The training component 42 may include a label generator 98, which applies rules for generating a label 94 for each predefined utterance 36. In particular, the first words from the surface realization are gathered, which in strongly positional languages like English is sufficient to decide the nature of the label. A POS tagger, such as POS tagger 90 is applied to the predefined utterance 36 to identify pronouns and auxiliaries. The labels are built on these specific words. For example, the label generation rules may start with the first word of the utterance 36 and stop when either a verb or a pronoun and its auxiliary verb are found. This initial set of words then becomes the label 94. In other embodiments, the labels may be manually applied, e.g., by the annotators. Each word of the corresponding text snippet 34 from which the predefined question 36 was generated is then labeled by a label applier 100 with the label of the corresponding predefined utterance 36. The tokenizer 88 and POS tagger 90 are used to identify the words of the text snippet 34 and assign them respective features 86, as described above for the short description 70. A model generator 102 then trains the NLG model 58 using the extracted features 86 from the text snippets 34 and the labels 94 of the corresponding predefined questions 36.

TABLE 3 shows an example of text snippet annotation for a text snippet (Unable to send an email), for a question generation task. For each token of the text snippet in the first column, the corresponding POS is shown in the second column. The last column shows the question label, which the system is to learn. Each word of the text snippet with a recognized part-of-speech is assigned the label (are-you), generated from the corresponding predefined question (Are you able to send an email?).

TABLE 3

Text Snippet Annotation

| Token | Part-of-speech | Label |
|---|---|---|
| Unable | Adjective | are_you |
| to | Particle | are_you |
| send | Verb | are_you |
| an | Determiner | are_you |
| email | Noun | are_you |
| . | 0 | null |

The extracted features shown in TABLE 3 and corresponding set of labels are then used to train the NLG model.

Figure 2:
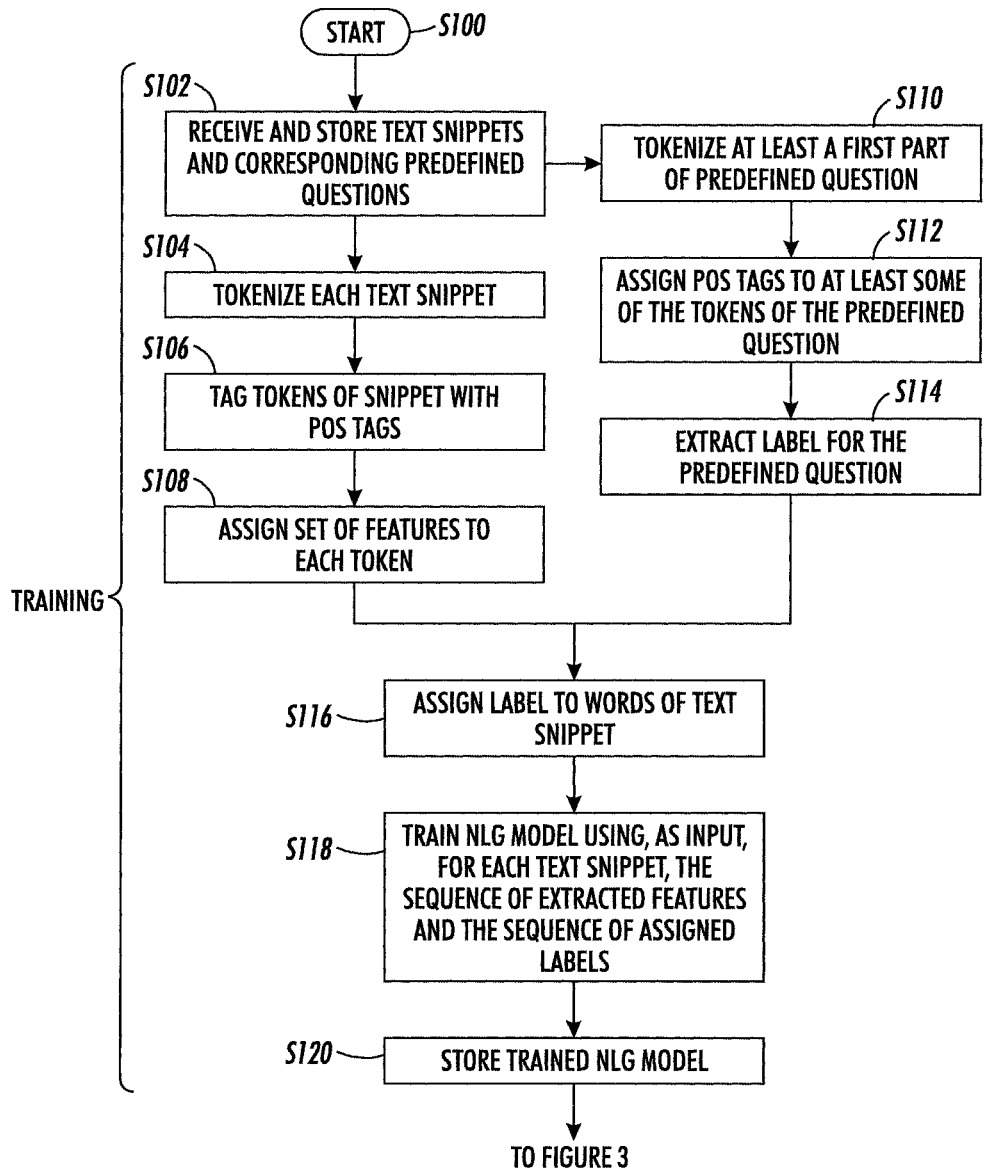
FIG. 2 is a flow chart illustrating a method for generating a model for natural language generation in accordance with another aspect of the exemplary embodiment.
Figure 3:
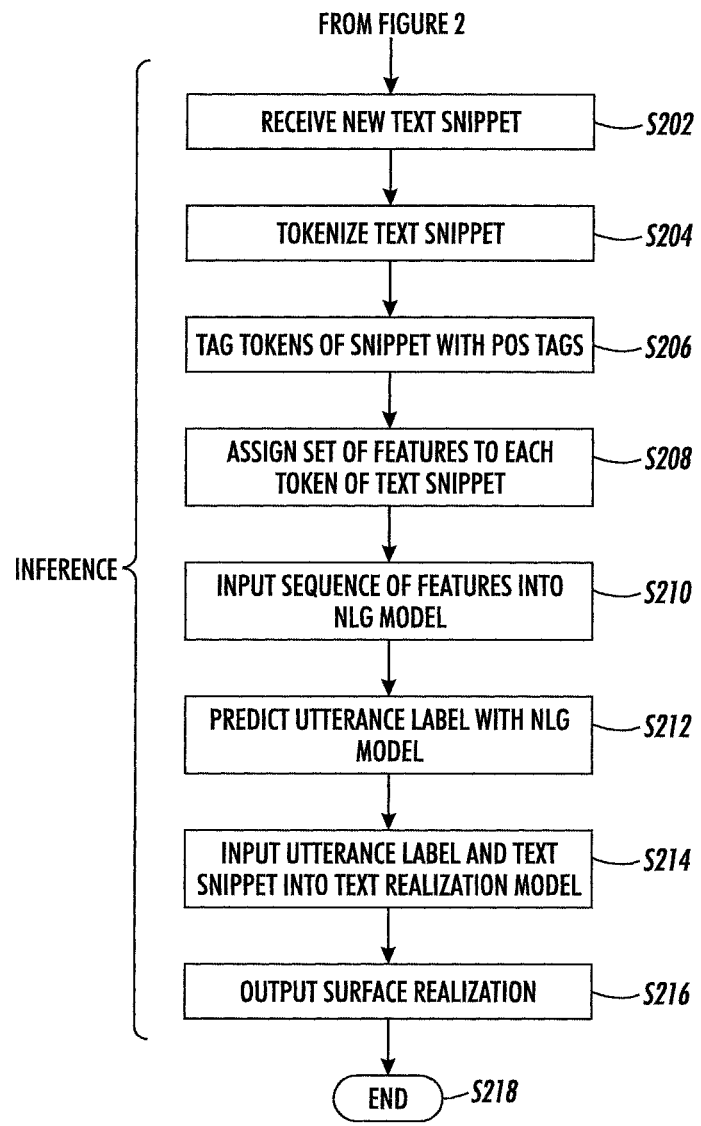
FIG. 3 is a flow chart illustrating a method for natural language generation in accordance with another aspect of the exemplary embodiment.

FIGS. 2 and 3 illustrate a method for language generation which may be performed with the system of FIG. 1. The method begins at S100. The method includes a training stage (FIG. 2) and an inference stage (FIG. 3).

At S102, text snippets 34 and corresponding predefined questions 36 are input to the system 10 and may be stored in memory 12.

At S104, each text snippet 34 is tokenized, by the tokenizer 88.

At S106, POS tags are assigned to the tokens of the text snippet, by the POS tagger 90. This may include accessing a lexicon to identify all possible parts-of-speech for each word, then selecting the most probable one through disambiguation. The POS disambiguation strategy may include rule based methods and/or statistical methods, which are often based on Hidden Markov models (see, for example, Jean-Pierre Chanod, et al., "Tagging French—comparing a statistical and a constraint-based method," Proc. From Texts To Tags: Issues In Multilingual Language Analysis, EACL SIGDAT Workshop. pp. 58-64 (1995)). These statistical or symbolic methods aim generally at disambiguating in the context of full sentences. Specific rules may be applied by the tagger to identify the specialized classes of verb and noun.

At S108, a set of features is assigned to each token by the features extractor 80, which may include its POS tags and optionally the token itself (e.g., its surface form and/or root form).

At S110, each predefined question 36 (or at least an initial few words thereof) is tokenized, by the tokenizer 88.

At S112, POS tags are assigned to at least some of the tokens of the predefined question, e.g., by the POS tagger 90. Here, only the POS tags which are used to extract the label need to be identified.

At S114, a label 94 is extracted from the predefined question 36, by considering the applied POS tags of the initial words.

At S116, the label of the predefined question 36 is assigned to each of the words of the text snippet 34.

At S118, the NLG model 58 is trained using, as input, for each text snippet 34, the sequence of features extracted at S108 and the sequence of labels assigned at S116.

At S120, the trained model 58 is stored in memory 12 or in memory accessible to the system 10. Some or all of steps S102 to S120 may be repeated to train one or more additional NLG models for one or more different NL utterance types. One NLG model 58 may be learnt for each targeted communicative function, e.g., questions, confirmations, affirmations, etc.

This ends the training phase, although the model(s) 58 may be subsequently updated if more training data 34, 36 is provided.

Figure 4:
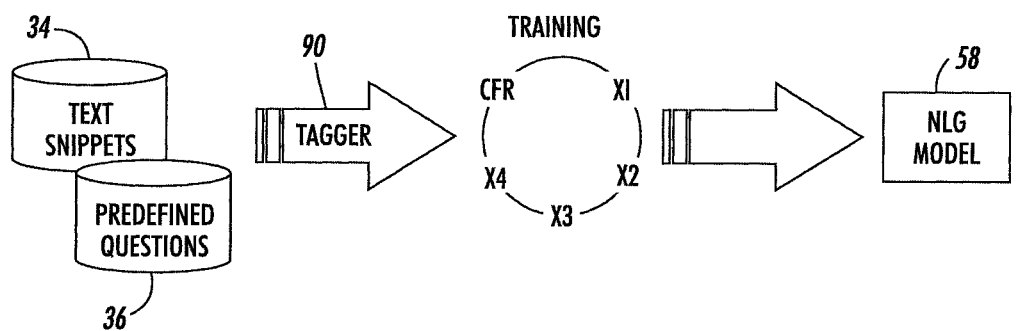
FIG. 4 graphically illustrates the method of FIG. 2.

FIG. 4 graphically illustrates the training stage.

As shown in FIG. 3, the inference stage assumes the provision of the trained NLG model 58.

At S202, a text snippet 70 is received, e.g., by the NLG component 54 from the DM 52, or is otherwise input. The exemplary text snippet 70 has no associated predefined question 36, no associated label 94, and is not in the interrogatory form.

At S204, the text snippet 70 is tokenized, by the tokenizer 88.

At S206, POS tags are assigned to the tokens of the text snippet 70, by the POS tagger 90.

At S208, a set of features 86 is assigned to each token of the text snippet 70 by the features extractor 80, which may include its POS tags and optionally the token itself (e.g., its surface form and/or root (lemma) form), in the same manner as for the text snippets 34.

At S210, the sequence of token features 86 is input to the trained NLG model 58, by the labeling component 82, and at S212, a predicted label 94 for the text snippet 70 is output by the model 58. The label is drawn from the set of labels seen during training. As will be appreciated, rather than outputting a single most probable label, the model 58 may output probabilities for each of some or all the labels, and a label or labels 94 may be drawn from the set based on the probabilities.

At S214, the utterance label 94 selected at S210 and text snippet 70 are used, by the surface realization component 84, to generate an NL utterance 66, e.g., in the form of a question. This may include using a generation grammar and/or a set of automata to generate the NL utterance 66, using the utterance label 94 to select the entry point, as described above. The label is used to choose which realization form is executed though the generation grammar.

At S216, the generated NL utterance 66 may be output, by the output component 56, e.g., to the client device 22.

The method ends at S218.

Figure 5:
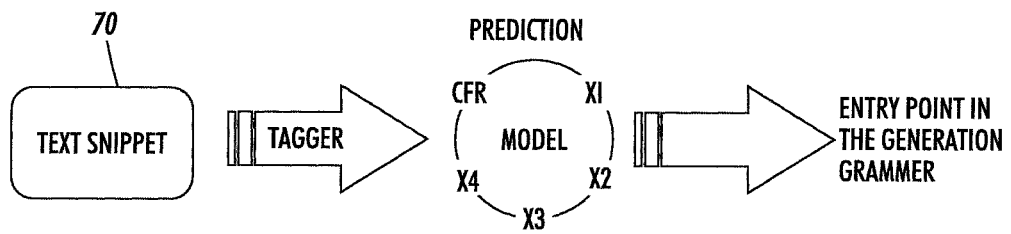
FIG. 5 graphically illustrates the method of FIG. 3.

FIG. 5 graphically illustrates the inference process of generation in accordance with one embodiment. A text snippet is supplied as input, tagged with POS tagger to find the features, and these are input to the CRF model. The model yields a label, which is used as an entry point in the generation grammar. The generation grammar is then applied.

The method illustrated in FIG. 2 and/or FIG. 3 may be implemented in a computer program product (or products) that may be executed on a computer. The computer program product may comprise a non-transitory computer-readable recording medium on which a control program is recorded (stored), such as a disk, hard drive, or the like. Common forms of non-transitory computer-readable media include, for example, floppy disks, flexible disks, hard disks, magnetic tape, or any other magnetic storage medium, CD-ROM, DVD, or any other optical medium, a RAM, a PROM, an EPROM, a FLASH-EPROM, or other memory chip or cartridge, or any other non-transitory medium from which a computer can read and use. The computer program product may be integral with the computer 30, (for example, an internal hard drive of RAM), or may be separate (for example, an external hard drive operatively connected with the computer 30), or may be separate and accessed via a digital data network such as a local area network (LAN) or the Internet (for example, as a redundant array of inexpensive or independent disks (RAID) or other network server storage that is indirectly accessed by the computer 30, via a digital network).

Alternatively, the method may be implemented in transitory media, such as a transmittable carrier wave in which the control program is embodied as a data signal using transmission media, such as acoustic or light waves, such as those generated during radio wave and infrared data communications, and the like.

The exemplary method may be implemented on one or more general purpose computers, special purpose computer(s), a programmed microprocessor or microcontroller and peripheral integrated circuit elements, an ASIC or other integrated circuit, a digital signal processor, a hardwired electronic or logic circuit such as a discrete element circuit, a programmable logic device such as a PLD, PLA, FPGA, Graphics card CPU (GPU), or PAL, or the like. In general, any device, capable of implementing a finite state machine that is in turn capable of implementing the flowchart shown in FIG. 2, can be used to implement the method. As will be appreciated, while the steps of the method may all be computer implemented, in some embodiments one or more of the steps may be at least partially performed manually. As will also be appreciated, the steps of the method need not all proceed in the order illustrated and fewer, more, or different steps may be performed.

The exemplary embodiments described herein provide a method and an algorithm to detect which surface realizations (e.g., question formulations) could be directly produced out of a sequence of words, such as a text snippet.

One advantage of exemplary embodiment is that the annotation process is minimal. Instead of selecting words or phrases, the exemplary system only requires the annotator to supply the formulation 36 that corresponds to the text snippet meaning. The annotation may alternatively include selecting words or phrases in the text and providing a label, which conveys the interpretation that has to be learnt by the system.

Unlike a conventional classifier training system, which requires the annotator to supply class labels, in the exemplary system and method, the annotations are provided as targeted surface realizations, without specific labels to identify the classes. To supply the class labels, the surface realizations (in particular, the first words from the surface realization) are themselves used as labels.

Without intending to limit the scope of the exemplary embodiment, the following examples illustrate the application of the method.

EXAMPLE

This example is in the context of customer care automation. A list of text snippets corresponding to symptoms are extracted, each associated to a manually provided question. Each text snippet is processed as followings. First, each text snippet is tokenized into a sequence of words. Then, each word is checked against an English dictionary to extract its parts-of-speech. Thereafter, a commercially available POS tagger is applied to keep only one part-of-speech per word. Finally, POS tags are produced to reflect the form of verbs and nouns as illustrated in TABLE 2 above. TABLE 3 shows an example of text snippet annotation, for a question generation task, used for evaluation purposes.

In this example, 1666 sentences (text snippets) extracted from a customer corpus were used to train the NLG model (CRF model), along with the labels of their manually-generated interrogatory sentences. The CRF model was then applied on 756 sentences for which no labels are provided, and a manual evaluation of the results was performed. During the prediction step, the only information needed is the output from the lexicon and the tagger to detect which surface realization to choose. To evaluate the method for the specific task of question formulation, the final surface realization is validated manually, as proposed in Tsung-Hsien Wen, et al., "Semantically conditioned LSTM-based natural language generation for spoken dialogue systems," EMNLP, pp. 1711-1721 (2015). The surface realization was correct for 724 text snippets out of 756 (95%).

It will be appreciated that variants of the above-disclosed and other features and functions, or alternatives thereof, may be combined into many other different systems or applications. Various presently unforeseen or unanticipated alternatives, modifications, variations or improvements therein may be subsequently made by those skilled in the art which are also intended to be encompassed by the following claims.

What is claimed is:

1. In an automated dialog system for conducting a dialog with a human user, a method for natural language generation comprising:
   providing a natural language generation model which has been trained to assign an utterance label to a text sequence that is not in interrogatory form, the utterance label being based on features extracted from the text sequence, the trained model being a sequential decision model selected from a Conditional Random Field model, a recurrent neural network model, and a combination thereof, the utterance label being selected from a set of utterance labels which have been learned by the natural language generation model using a training set of text sequences that are not in an interrogatory form, each of the learned utterance labels including a sequence of at least one word, the sequence including an auxiliary verb;
   receiving a user utterance from the human user;
   processing the user utterance to detect missing information, the processing including selecting a new text sequence from a knowledge base, wherein the new text sequence is not in an interrogatory form, the knowledge base including descriptions of problems and corresponding solutions, the new text sequence being from one of the descriptions;
   extracting features from the new text sequence;
   assigning an utterance label from the learned utterance labels to the new text sequence, based on the extracted features, with the trained natural language generation model;
   generating a natural language utterance in an interrogatory form from the new text sequence, using the assigned utterance label to guide the generation of the natural language utterance in the interrogatory form; and
   outputting the natural language utterance in the interrogatory form to the human user,
   wherein the extracting and generating are performed with a processor.

2. The method of claim 1, wherein the method further comprises training the natural language generation model on features extracted from a collection of text sequences and corresponding utterance labels, the utterance label of each of the text sequences in the collection being generated from a subset of the words of a natural language utterance provided by an annotator for the text sequence.

3. The method of claim 2, wherein the natural language utterance provided by an annotator is an interrogatory form of the respective text sequence.

4. The method of claim 1, wherein the utterance label comprises a sequence of words terminating in an auxiliary verb or a pronoun.

5. The method of claim 1, wherein the natural language utterance is in the form of a question.

6. The method of claim 1, wherein the extracting features from the text sequence includes identifying parts-of-speech for tokens of the text sequence, at least some of the features comprising the identified parts-of-speech.

7. The method of claim 6, wherein the parts-of-speech include parts-of-speech for different types of verb.

8. The method of claim 7, wherein the parts-of-speech for different types of verb are selected from the group consisting of:
   a verb which is in the 3rd person;
   a verb which is a gerund;
   a verb which is a past-participle; and
   a verb which is an infinitive.

9. The method of claim 6, wherein the extracted features further include features derived from the tokens.

10. The method of claim 1, wherein the generating a natural language utterance from the text sequence comprises using a generative grammar or set of automata, parts of which being labeled with utterance labels from a set of utterance labels applied by the natural language generation model.

11. The method of claim 1, wherein the assigning of an utterance label to the text sequence comprises labeling each word in the text sequence with the assigned utterance label.

12. The method of claim 1, wherein the method further comprises outputting the natural language utterance to a client device during a dialog with a user.

13. The method of claim 1, wherein the new text sequence is no more than a single sentence.

14. A computer program product comprising a non-transitory recording medium storing instructions, which when executed on a computer, causes the computer to perform the method of claim 1.

15. A system comprising memory which stores instructions for performing the method of claim 1 and a processor in communication with the memory for executing the instructions.

16. A system for natural language generation comprising:
   memory which stores:
      a dialog manager, which detects missing information in a dialog state for a dialog between a user and a virtual agent and selects a new text sequence from a knowledge base, wherein the new text sequence is not in an interrogatory form;
      a natural language generation model which has been trained to assign an utterance label from learned utterance labels to a text sequence that is not in an interrogatory form based on features extracted from the text sequence, each of the learned utterance labels corresponding to words of an interrogatory utterance, the natural language generation model being a sequential decision model selected from a Conditional Random Field model, a recurrent neural network model, and a combination thereof, the natural language generation model having been trained using a training set of text sequences that are not in an interrogatory form;

a features extractor which extracts features from an input text sequence, the features including parts-of-speech;

a labeling component which assigns an utterance label to the input text sequence, based on the extracted features, with the trained natural language generation model;

a surface realization component which generates a natural language utterance in an interrogatory form from the input text sequence, using the assigned utterance label to guide the generation of the natural language utterance; and a processor which implements the dialog manager, feature extractor, labeling component, and surface realization component.

17. The system of claim 16, further comprising a training component for training the natural language generation model.

18. A method for generating a natural language generation system, comprising:

receiving a collection of text sequences from a knowledge base comprising descriptions of problems and corresponding solutions, the text sequences not being in an interrogatory form, and for each text sequence, a natural language utterance in an interrogatory communicative form which corresponds to a meaning of the text sequence;

extracting utterance labels from the natural language utterances, each utterance label comprising a sequence of at least one word and including an auxiliary verb;

extracting features from each of the text sequences;

training a natural language generation model to assign an utterance label to a new text sequence that is not in an interrogatory form, based on the extracted features from each of the text sequences and the extracted utterance labels, the trained model being a sequential decision model selected from a Conditional Random Field model, a recurrent neural network model, and a combination thereof;

indexing parts of a realization model according to respective utterance labels for guiding the generation of a natural language utterance from a new text sequence, using an assigned utterance label;

wherein at least one of the extracting utterance labels, extracting features, training the natural language generation model and indexing parts of the realization model is performed with a processor.

19. A system comprising memory which stores instructions for performing the method of claim 18 and a processor in communication with the memory for executing the instructions.

20. The method of claim 1, wherein the trained model comprises a linear chain Conditional Random Field model.

21. The method of claim 1, wherein the trained model comprises a Long Short-Term Memory encoder.

22. The method of claim 1, wherein an index stores the set of utterance labels generated in training and for each label, a list of the grammar parts or automata which can be used with that label for generating the natural language utterance in an interrogatory form.

* * * * *